Jan. 29, 1952  H. H. POHL  2,583,879
ANTISKID CHAIN
Filed Oct. 11, 1948
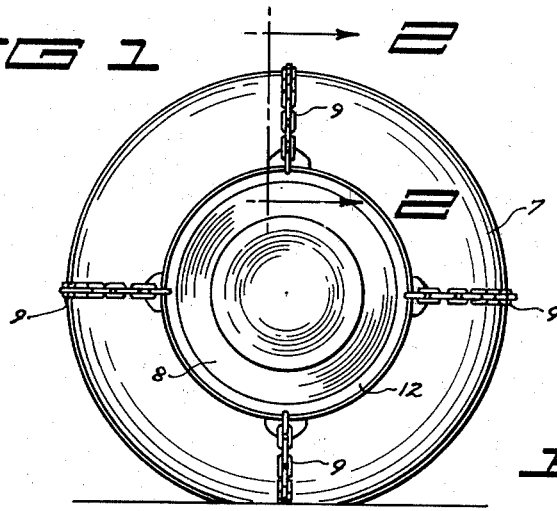
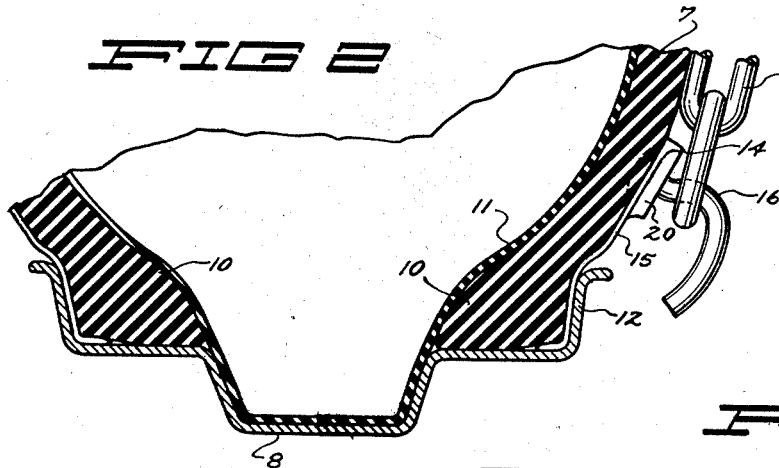
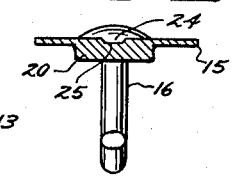
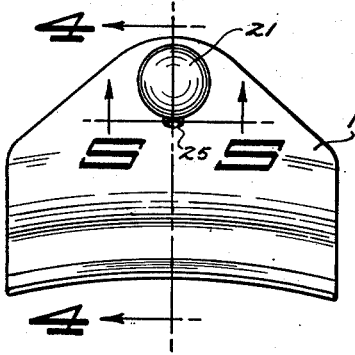
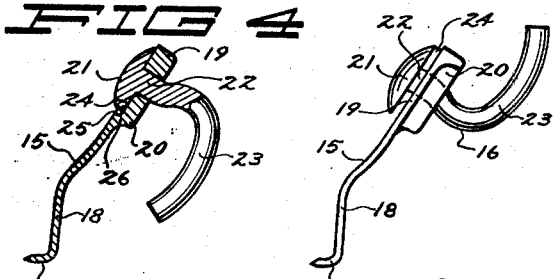
Inventor
HERBERT H. POHL
By Carlsen & Hagle Patented Jan. 29, 1952

2,583,879

UNITED STATES PATENT OFFICE 2,583,879

ANTISKID CHAIN

Herbert H. Pohl, Minneapolis, Minn.

Application October 11, 1948, Serial No. 53,931

4 Claims. (Cl. 152—233)

This invention relates to improvements in anti-skid devices and more particularly to devices for quickly and efficiently securing cross chains around tires mounted on vehicle wheels.

There are of course many types of automobile tire chains and grips in use today, many of which are secured to the tire by means of passing a strap or belt thru an opening in the wheel. However, many modern vehicle wheels are constructed of pressed steel without any openings between the hub and rim prohibiting use of this type of chain. Other types of anti skid devices depend on securing the chain or lug terminals in some manner between the wheel rim and the tire mounted thereon. However, these have not heretofore allowed sufficiently quick attachment or removal of the chain, and are frequently difficult and awkward to attach and detach.

It is therefore the primary object of my invention to provide a tire chain having an anchoring device which allows quick attachment or removal of the chain and which may be easily secured to any type of automobile wheel.

Another object is to provide an anti skid device which is durable and which may be inexpensively manufactured.

These and other more detailed and specific objects will be disclosed in the course of the following specification, reference being had to the accompanying drawings, in which—

Fig. 1 is a view in side elevation of a pneumatic tire mounted on an automobile rim and showing several of my anti skid devices attached thereto in peripherally spaced positions.

Fig. 2 is an enlarged transverse sectional view along line 2—2 of Fig. 1 showing, in greater detail, my device for securing the chain on the tire.

Fig. 3 is a full face view of the securing device as seen from its inner side.

Fig. 4 is a section taken along line 4—4 in Fig. 3.

Fig. 5 is a section taken along line 5—5 in Fig. 3.

Fig. 6 is an end or edge view of the securing device showing the chain engaging hook in the upward or chain releasing position.

Referring more particularly to the drawing and by reference characters 7 designates a conventional pneumatic automobile tire mounted on the felly or rim structure 8. The numerals 9 denote generally several of my anti skid devices secured in spaced positions circumferentially around the tire. The means of securing each chain to the wheel is best shown in the enlarged sectional view, Fig. 2. Beads 10 of tire 7 are held laterally in place on the rim by being disposed between the inner tube 11 and the upturned side flanges 12 of rim 8.

The anti skid device 9 is composed generally of a piece of link chain 13 or other suitable non skid element extending transversely around the outside of the tire casing and terminal anchoring or securing devices designated generally by the numeral 14. The anchoring device 14 is of simple construction comprising a retainer plate 15 and a hook member 16. The retainer plate 15 is formed of stamped sheet steel or any other suitable material and has an inner flange or bill 17 along its lower marginal edge adapted to fit under the tire bead 10 and thereby anchor the plate in position. Above the flange 17 the retainer plate is formed with a back portion 18 which conforms to the curvature of the rim flange 12 and a top portion 19 to extend outside the rim and along the tire wall. The bottom portion of the plate is longitudinally arched to conform to the curvature of the rim 8 on which it is to be seated. The edge of the flange 17 is preferably bevelled to expedite its insertion under the tire bead. The top portion 19 of the plate may be reinforced by a small block 20 which is welded or otherwise secured to the exposed side of the plate portion above the wheel rim. This portion of the plate is reinforced to enable it to better resist the strain of the hook member 16 which is journaled therein in a manner now to be described.

The reinforced top portion 19 of the retainer plate 15 is apertured to rotatably receive and retain the hook member 16. This hook member is shown as formed from a common flat headed pin having a head 21, shank 22, and a curved hook portion 23. The shank 22 is journaled in the aforementioned plate aperture to allow free turning movements of the hook member so that hook portion 23 may hold or release a link of chain 13. The head 21 is thus disposed between the tire wall and the retainer plate 15. The under or plate contacting side of the head 21 is provided with a small lug 24 adapted for seating and unseating engagement with a recess 25 in plate 15. This recess 25 is of such size as to snugly receive lug 24 and is located just below the aperture in the plate. It is important to note that the lug is so positioned on the head that it seats in the recess only when the hook position is in its chain securing position. As will be seen in Fig. 2 the shank of the hook immediately adjacent the plate is curved upwardly so that the normal pull of the tire chain 13 is thus utilized to retain the lug 24 in its seat with the shank 22 serving as a lever. This tends to prevent any turning of the hook member 16 which might accidentally release the chain.

To connect the securing device to the wheel the tire tube 11 is first partially deflated to allow wedging of the anchor plate 15 into position between the rim and the tire, and with the flange or toe 17 inserted under the tire bead 10. The tube is then inflated to the normal air pressure forcing the bead of the tire outward to firmly secure the plate. This pressure also brings the wall of the tire into frictional contact with the head 21 of hook 16. A link of chain 13 is then placed over the hook and the hook turned to the securing position pointing toward the axis of the wheel (Fig. 2). As the hook is turned the lug 24 engages recess 25 to releasably hold the hook against turning.

As will be noted the sides of lug projection 24 and recess 25 are bevelled. This allows the hook to be turned moving the head 21 against the tire wall and forcibly sliding the lug out of its seat. When the hook is turned to the position shown in Fig. 6 the chain link may be easily removed over the end thereof.

Of course my type of anchoring device may be used to secure both ends of the chain. However it is only necessary to have the pivoted or swingable hook on one side of the wheel.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. An anti-skid device for a rim mounted tire comprising a tread member extending transversely about the exterior of the tire and having a link element at one of its ends, means for securing the tread member in position including an anchor plate retained between the tire and rim and extending along the exposed wall of the tire adjacent the rim, a hook member for releasably securing said link element of the tread member, a head formed on said hook member adapted to be maintained between said anchor plate and the tire, said hook having a shank portion pivotally mounted in the extended portion of the anchor plate for rotation about an axis that is substantially normal with respect to the adjacent transverse curvature of the tire whereby the link will exert a pull on the hook in a generally right angular direction to said axis when the hook is in tread member holding position, and means responsive to pulling stress by the tread member for releasably securing the hook in such holding position.

2. A device for releasably securing one end of an anti-skid tread member to a wheel rim having a tire mounted thereon comprising, a plate anchored between the tire and rim and having an exposed portion extending from therebetween, a hook member having a shank portion rotatably secured in the exposed plate portion for turning movement about an axis substantially perpendicular to the adjacent tire wall whereby pulling stress from the tread member will be substantially at right angles to such axis, the inner end of the hook member having a retention head for rotational contact with the plate and said head being formed with a projection for frictionally engaging a part of the plate to releasably secure the hook member against rotation from its normal tread member securing position.

3. A device for releasably securing one end of an anti-skid tread member to a wheel rim having a tire mounted thereon comprising, a plate secured flush against the outer wall of the tire adjacent to the rim, a hook member turnably pivoted in the plate and having a head disposed on the inner side of the plate where it will be frictionally engaged by the tire wall to resist turning of the hook member, the outer end of the hook shank having a hook like finger extending in a generally radial direction with respect to the turning axis of the member whereby the tread member may be secured and released by manual turning of the hook member against the frictional resistance of said head between the plate and tire.

4. A device for releasably securing one end of an anti-skid tread member to a wheel rim having a tire mounted thereon comprising, a plate secured flush against the outer wall of the tire adjacent to the rim, a hook member turnably pivoted in the plate and having a head disposed on the inner side of the plate where it will be frictionally engaged by the tire wall to resist turning of the hook member, the outer end of the hook shank having a hook like finger extending in a generally radial direction with respect to the turning axis of the member whereby the tread member may be secured and released by manual turning of the hook member against the frictional resistance of said head between the plate and tire, said head being further provided with an extension for contact with an offset portion of the plate to further increase frictional resistance to turning movement of the hook member from its tread member holding position.

HERBERT H. POHL.

REFERENCES CITED

The following references are of record in the file of this patent:

UNITED STATES PATENTS

| Number | Name | Date |
|---|---|---|
| 1,238,553 | Morse | Aug. 28, 1917 |
| 1,492,040 | Lifquist | Apr. 29, 1924 |
| 1,494,892 | Finley | May 20, 1924 |
| 2,201,397 | Goldenberg | May 21, 1940 |